INVENTOR.
LESLIE E. SODERQUIST
BY Hamilton, Cook,
Renner & Kenner
ATTORNEYS

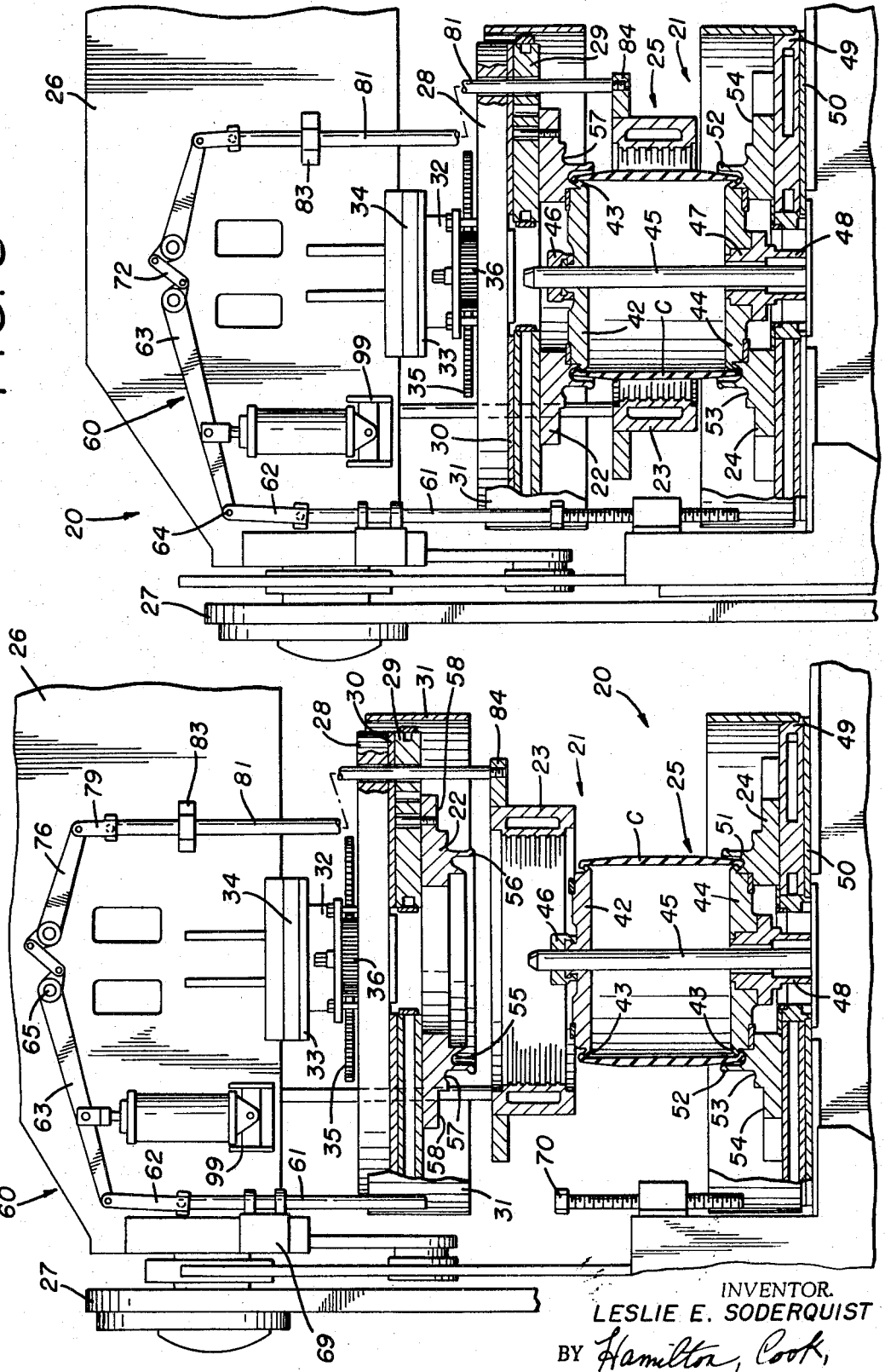

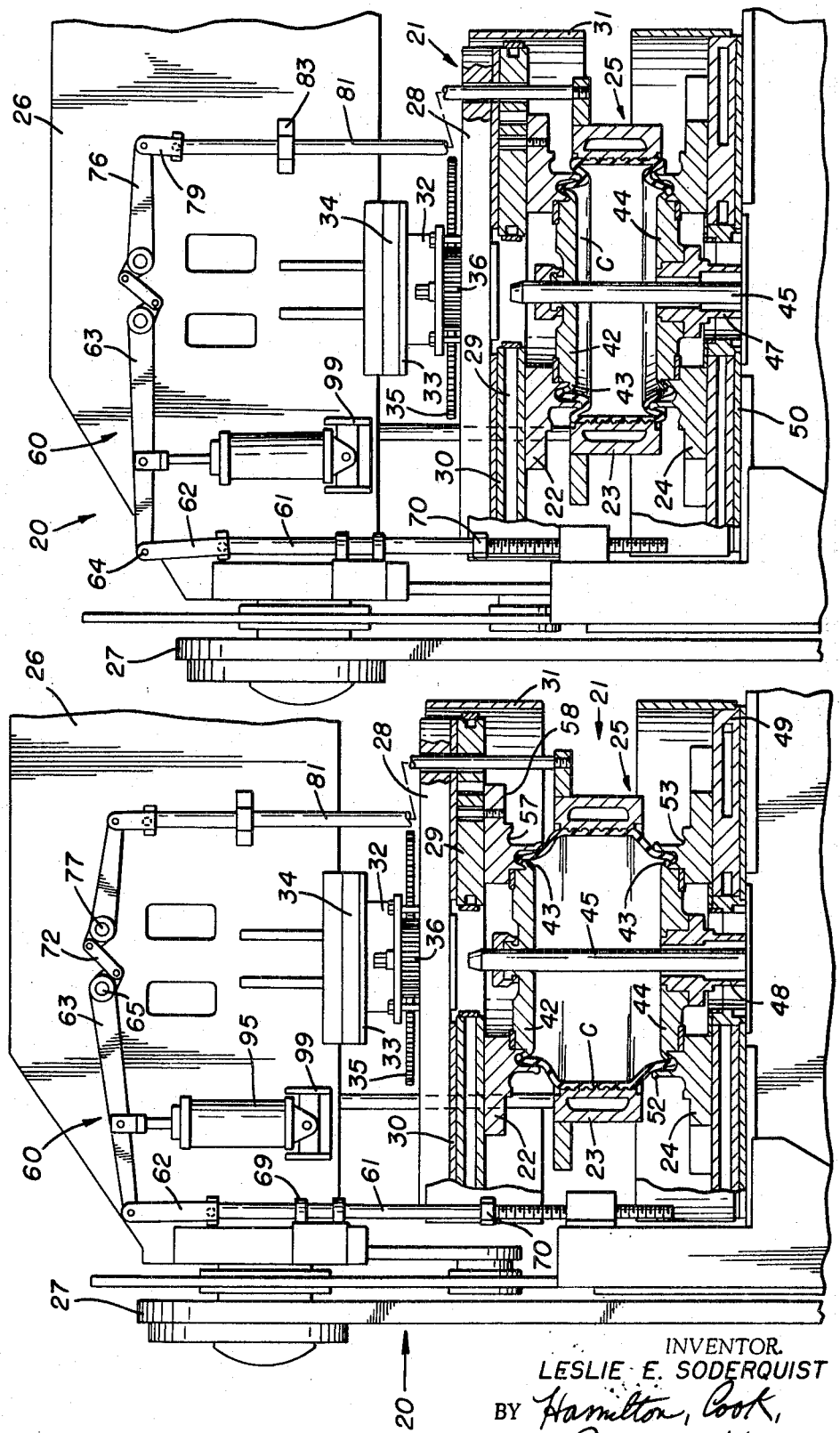

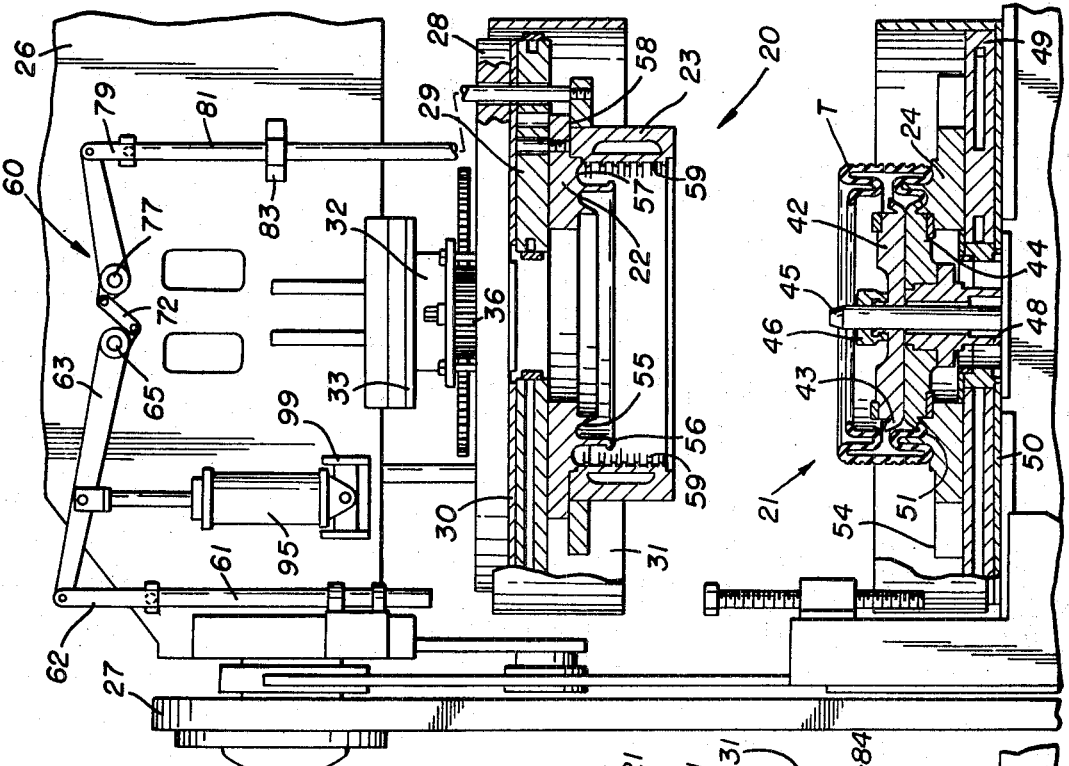
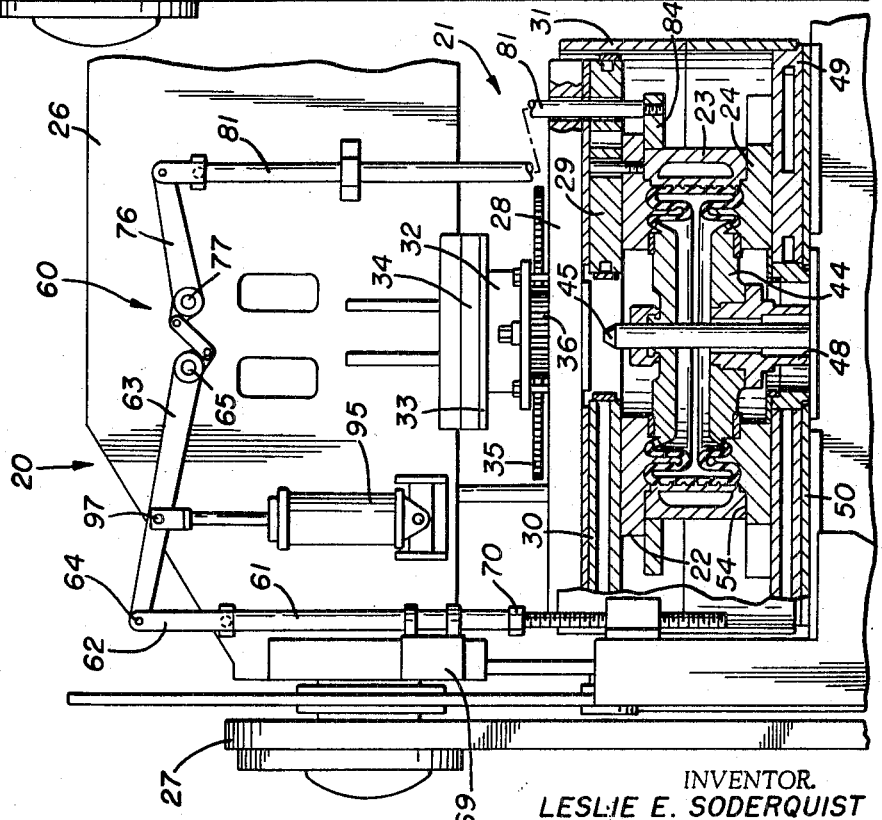

Nov. 24, 1970  L. E. SODERQUIST  3,541,643
VULCANIZING PRESSES
Filed Feb. 20, 1968  6 Sheets-Sheet 5
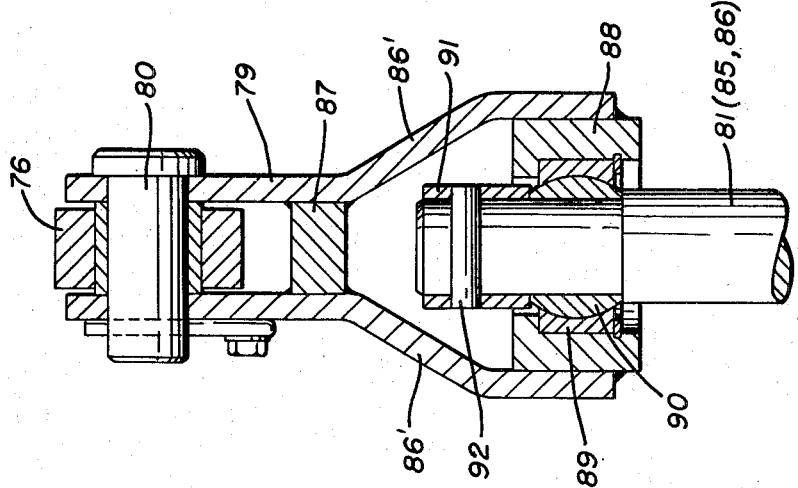
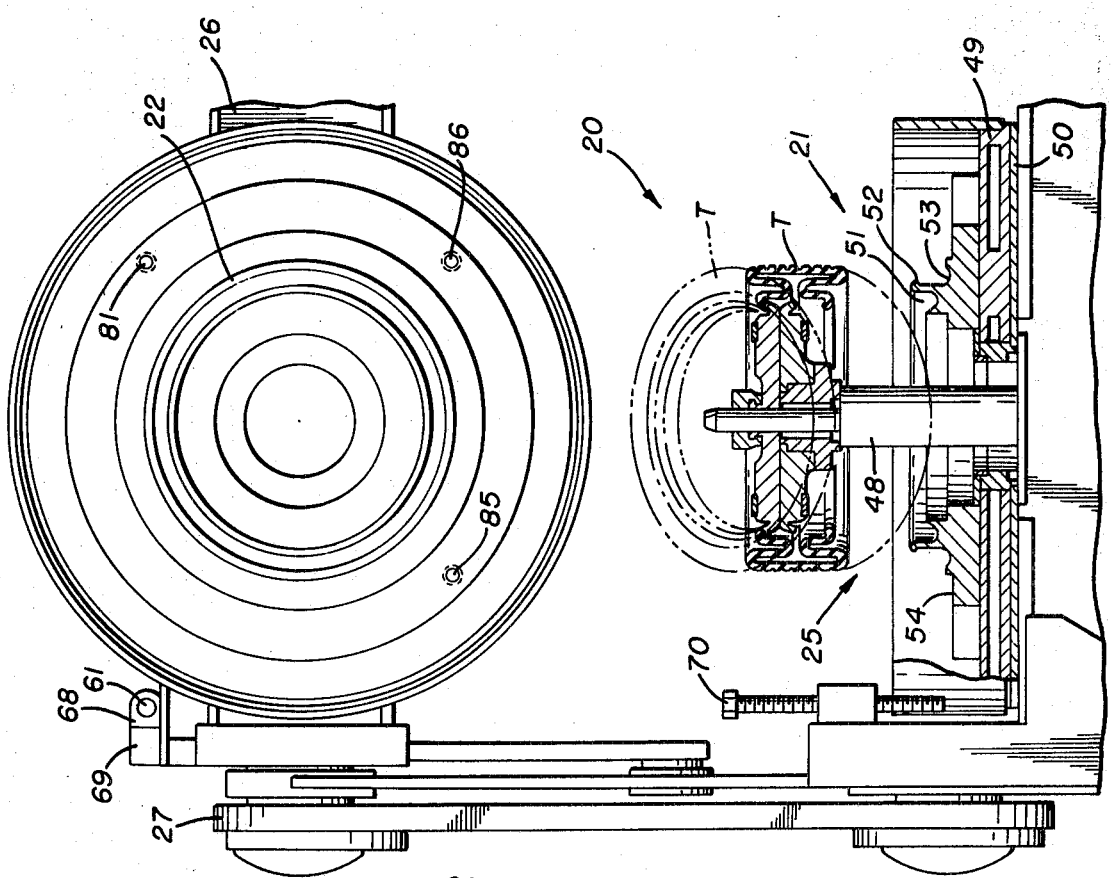
INVENTOR.
LESLIE E. SODERQUIST
BY Hamilton, Cook,
Renner & Kenner
ATTORNEYS

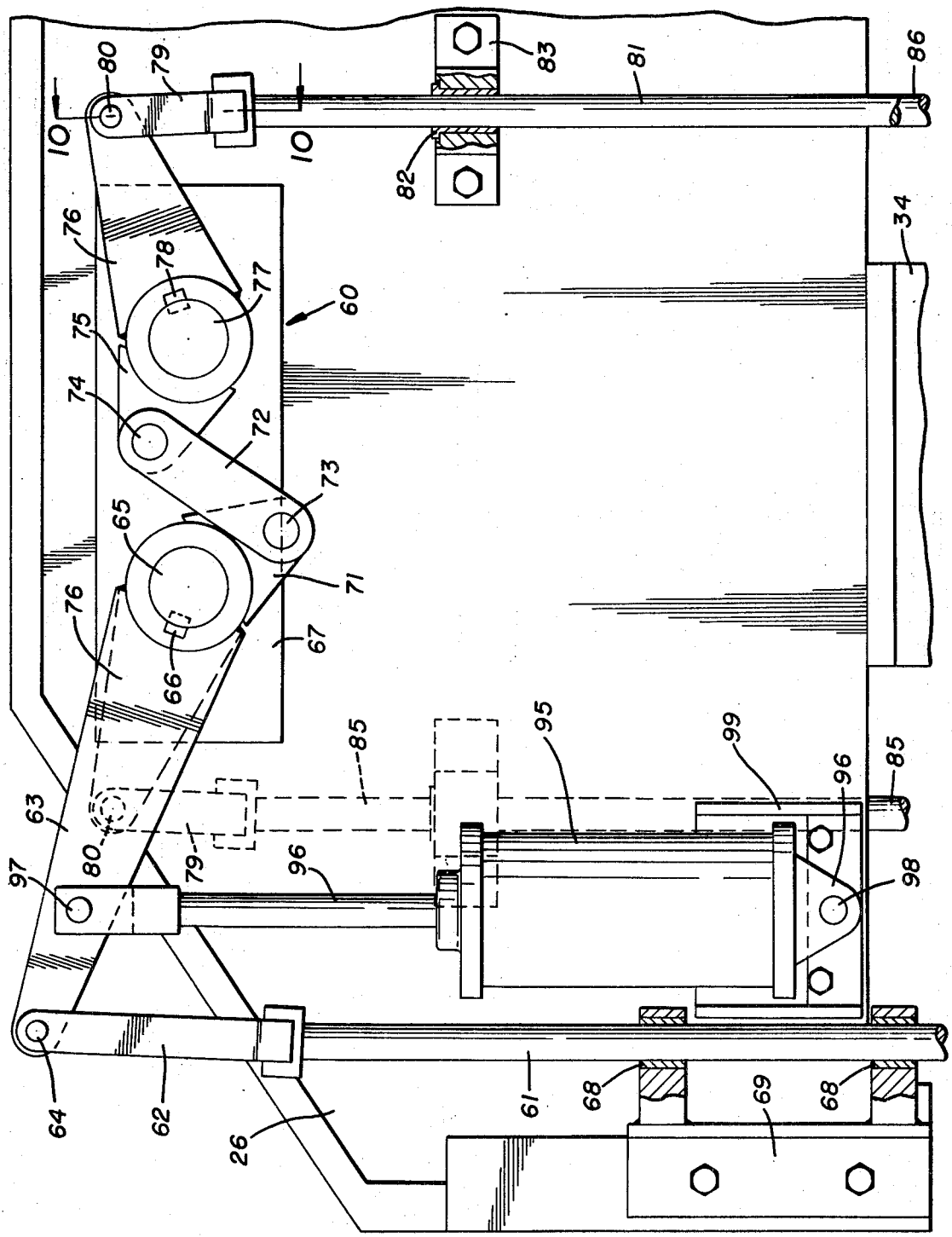

United States Patent Office 3,541,643
Patented Nov. 24, 1970

3,541,643
VULCANIZING PRESSES
Leslie E. Soderquist, Silverlake, Ohio, assignor to McNeil Corporation, Akron, Ohio, a corporation of Ohio
Filed Feb. 20, 1968, Ser. No. 706,961
Int. Cl. B29h 5/00
U.S. Cl. 18—17
11 Claims

ABSTRACT OF THE DISCLOSURE

Vulcanizing press for manufacture of pneumatic tire having folded side wall portions in three-part mold. Press includes feature of controlling motion of middle or tread mold part as a function of press closing motion. Press also includes center mechanism having means to seat beads of green tire carcass against outer or end mold parts prior to folding during press closing motion.

BACKGROUND OF THE INVENTION

The invention has long been active in the art relating to tire vulcanizing presses. The present invention is intended to adapt certain prior press designs of the inventor, such as shown in United States Pats. No. 2,812,544 and No. 2,812,545, for use in the manufacture of pneumatic tires having folded side wall portions; a so-called "expansible tire."

As presently known, an "expansible tire" having folded side wall portions is described in United States Pat. No. 3,347,300. Such tires are disclosed as being made according to the method and apparatus of United States Pat. No. 3,347,964.

The prior art patents of the inventor as identified above relate to the "bagless cure" art; that is, to vulcanizing presses for shaping and curing of a tire with fluid pressure being exerted directly on the inner surface of a green tire carcass. These and other "bagless cure" patents could be used in the practice of the present invention.

Referring to Pat. No. 3,347,964, the technique of making an "expansible tire" now includes as the first step loading or positioning—

". . . an annular green tire carcass of substantially cylindrical shape with coaxial bead portions at the opposing open ends of the carcass, a tread portion on the outside of the carcass, and side wall portions extending from the tread portion to each bead portion"; (col. 3, 11.51–57), between or onto, ". . . supporting means including oppositely facing end mold plates which are engageable with the opposing bead portions of the said green tire carcass, at least one of said mold end plates being movable toward and away from the other."; (col. 5, 11.25–29).

This first step of "loading" or "positioning" a green tire carcass onto an axially movable lower "end mold plate" is also known from prior art such as United States Pat. No. 2,495,663.

The next step of Pat. No. 3,347,964 is—

"folding one [sic] of the side wall portions into a channel extending axially of the carcass and concentrically inside the tread portion"; (col. 3, 11.58–60), by using, ". . . an annular rigid folding ring on each end mold plate which is engageable with the outside surfaces of the side wall portions of the tire carcass adjoining the bead portion engaged by the ring and over which said side walls are deflected as said movable end mold plates are moved toward each other"; (col. 5, 11.32–35; col. 6, 11.1–3).

This second step of "side wall folding" is also known from prior art such as United States Pat. No. 1,480,719.

During "side wall folding," the operational procedure of Pat. No. 3,347,964 calls for—

"constraining the tread portion of said green carcass . . . to limit circumferential expansion of the tread to a diameter only slightly larger than the diameter of the bead portion of the folded side wall and significantly smaller than the eventual inflated operating diameter of the tread portion"; (col. 3, 11.61–66), by providing, ". . . an annular rigid tread molding part for encircling the tread portion of said tread carcass and constraining circumferential expansion of said carcass"; (col. 6, 11.15–18).

A three-piece mold having an "annular rigid tread molding part" is also disclosed in United States Pat. No. 3,057,011. The concept of "constraining the tread portion" of an uncured tire is known from the old "pin ring" art as represented by United States Pat. No. 1,604,452.

The final step in the operational sequence of Pat. No. 3,347,964, calls for "curing" the "folded" and "constrained" green carcass in a closed three-part mold.

SUMMARY OF THE INVENTION

An object of the present invention is to provide an improved vulcanizing press for the manufacture of pneumatic tires having folded side wall portions in three-part molds.

Another object is to provide a vulcanizing press having relatively movable bead ring plates for seating the upper and lower beads of a green tire carcass against the outer or upper and lower end mold plates of a three-part mold prior to folding of the side walls.

Still another object is to provide a vulcanizing press wherein the outer or end mold plates forming the bead areas and side wall portions of a cured tire are moved relative to each other only by colsing or opening of the press; there being no requirement for separate or independent operating mechanisms such as elements 22, 24 of Pat. No. 3,347,964.

One of the principal objects of the invention is to control motion of the middle or tread mold section of a three-part mold as a function of the press closing motion. More specifically, an object is to provide a velocity ratio linkage on the press to control the movement of the tread mold section so that during folding of the side wall portions of a green tire carcass the tread mold section will be maintained at a predetermined position when in contact with the tread portion of a green tire carcass.

These objects of the invention are advantageously accomplished by a vulcanizing press according to the invention wherein each three-part mold includes a stationary lower end mold plate, mounted on the press base, a movable upper end mold plate carried beneath the top link of the press, and a middle or tread mold section carried beneath the upper mold plate by the velocity ratio linkage.

DESCRIPTION OF THE DRAWINGS

FIG. 2 is a similar view, sequential to FIG. 1, showing the top link of the press beginning a vertically downward movement (the mold elements and the velocity ratio linkage carried on the top link having moved forward approximately 90° from the position of FIG. 1, the section through the moving mold elements being taken substantially as indicated on line 2—2 of FIG. 1), with the lower bead ring plate being pulled down to seat the lower bead portion of a green tire carcass against the lower end mold plate, with the upper bead ring plate being extended up to support the upper bead portion of a green tire carcass, and with the tread mold section being lowered toward the medial portion of the green tire carcass;

FIG. 3 is a similar view, sequential to FIG. 2, showing further lowering of the top link, with the upper bead of the green tire carcass being seated against the upper end mold plate, with the tread mold section being further lowered to a center position equally spaced between the bead portions of the green tire carcass, and with the slide rod of the velocity ratio linkage being just engaging an adjustable stop which has been vertically prepositioned as determined by the total thickness or height of a closed mold when the press is in curing condition;

FIG. 4 is another similar view, sequential to FIG. 3, showing further lowering of the top link and the initial application of fluid pressure against the interior of the green tire carcass, with the side wall portions being just beginning to be folded by contact with annular rigid folding rings on the upper and lower end mold plates, the tread portion being radially distended to contact the tread mold section, and the velocity ratio linkage being actuated by engagement with the adjustable stop so that the tread mold section has been lowered one-half the distance that the upper end mold plate has been lowered;

FIG. 5 is another similar view, sequential to FIG. 4, showing continued closing movement of the top link and further application of fluid pressure for shaping the green tire carcass with the side wall portions continuing to fold and the velocity ratio linkage positively maintaining the tread mold section equally spaced between the bead portions;

FIG. 6 is another similar view, sequential to FIG. 5 and showing a vulcanizing press according to the invention in the fully closed condition for curing the green tire carcass to make an expansible tire;

FIG. 7 is another similar view, showing the opening movement of the top link with the upper bead ring plate being drawn down from the upper bead area of an expansible tire and with the velocity ratio linkage having been actuated to draw the tread mold section up and closed with the upper end mold plate, the tread mold section having been maintained in contact with the tread area of the expansible tire during stripping of the upper side wall area from the upper end mold plate;

FIG. 8, the last of the sequential views, shows a vulcanizing press according to the invention in the fully open condition with the bead ring plates having been extended up to strip the lower bead and side wall areas of the expansible tire from the stationary lower end mold plate and raise the tire to a position for unloading;

FIG. 9 is a fragmentary front elevation showing a portion of the top link and the components of the velocity ratio linkage carried thereon; and, FIG. 10 is an enlarged view in section, taken substantially as indicated on line 10—10 of FIG. 9.

DESCRIPTION OF THE PREFERRED EMBODIMENT

Figure 1:
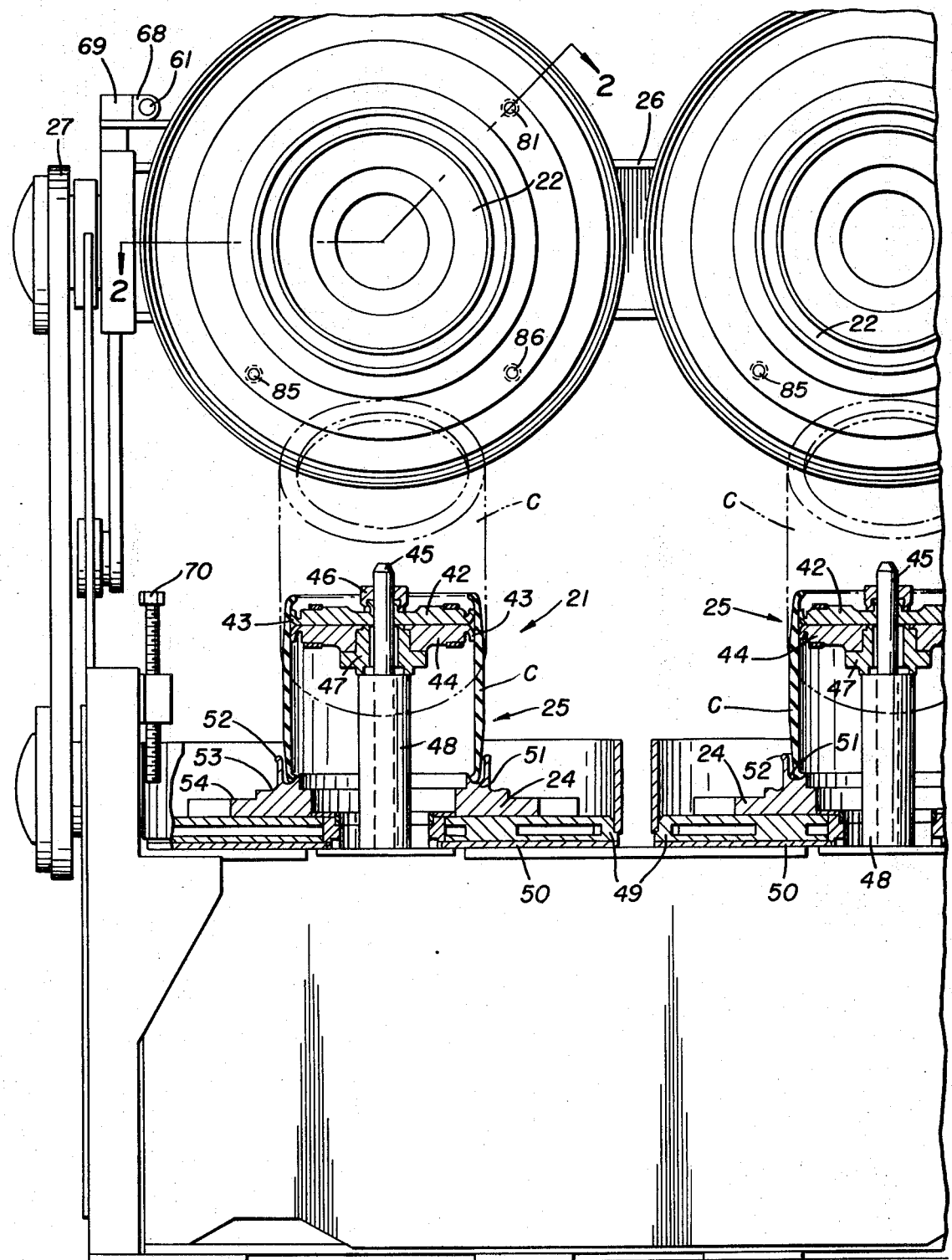
FIG. 1 is a fragmentary front elevation, partly in section, showing a vulcanizing press according to the invention in the fully open condition and having dual center mechanisms with upper and lower bead ring plates in condition for loading or positioning a green tire carcass onto a stationary lower end mold plate if a three-part mold.

In the drawings, a tire curing press suitable for practice of the invention is indicated generally by the numeral 20. As shown, the press 20 is a dual press having two sets of mold components indicated generally by the numeral 21, each mold 21 comprising an upper end mold plate 22, a tread mold section 23 and a lower end mold plate 24. The press 20 also has two center mechanisms as indicated generally by the numeral 25.

The press 20 has a heavy cross beam or top link 26 actuated as by side links 27 to open or close the press. Beneath the top link 26 is an upper platen or mold support assembly, one for each set of molds 21. As numerically identified in FIG. 2, a mold support assembly includes an upper support 28 and a heated platen 29, insulated as by a disk 30 of asbestos or equivalent material, enclosed within a shield 31, and joined together as an assembly by any suitable means. The upper support 28 is securely attached to the lower end of an adjusting sleeve 32. The sleeve 32 is carried within a ring 33 depending from a mounting block 34 attached to the underside of the top link 26. Suitable adjusting means such as a ring gear 35 attached to the sleeve 32, and a pinion 36 rotatably mounted on the upper support 28, may be provided to adjust the press for mold components of varying thickness.

The press elements 26 through 36, described above, are shown in United States Pat. No. 3,336,636, and other prior art patents to the inventor, to which reference is made for such details as are required to more fully understand the invention.

The center mechanism and lower mold component

A center mechanism 25 suitable for use in shaping and curing a green tire carcass C, in cooperation with a mold 21, has opposed, relatively movable elements or means to seat the bead portions of a carcass C against the end mold plates 22 and 24. As shown, there is an upper bead ring plate 42 and a lower bead ring plate 44. Each plate has a diameter slightly greater than the diameter of the bead portions of a carcass C and a peripheral flange 43 suitably shaped to seat the bead portions.

The upper bead ring plate 42 is centered on the upper end of a vertical shaft 45. As numerically identified in FIGS. 1 and 3, the plate 42 is held on the shaft 45 by a coupling member 46. The shaft 45 has a sliding fit in a sleeve 47 force-fitted in the center of the lower bead ring plate 44. The shaft 45 extends into a cylinder 48, the upper end of which is attached to the sleeve 47. Within the cylinder 48, the lower end of the shaft 45 carries a piston (not shown) which is actuated by a suitable fluid pressure means to selectively extend or retract the shaft 45.

The press elements 45 through 48, including the piston and the fluid pressure means, are of the type shown in United States Pat. No. 2,812,545, particularly at col. 3, 11.70-75 and col. 4, 11.1-21, thereof, to which reference is made for such details as are required to more fully understand the invention.

The lower bead plate ring 44 is raised or lowered between the high position shown in FIGS. 1 and 8 and the low position shown in FIGS. 2 through 7 by an operating mechanism (not shown) within the base of the press. A suitable operating mechanism may be of the type shown in United States Pat. No. 2,812,545, particularly at col. 4, 1.75 and col. 5, 11.1–48, to which reference is made for such details as are required to more fully understand the invention.

The fluid media for shaping a carcass C and thereafter for curing an expansible tire T is admitted into the interior of the tire carcass C at a suitable time following the condition illustrated in FIG. 3. The fluid pressure supply is maintained until the end of the curing condition illustrated in FIG. 6. Thereafter, if the fluid media for curing is steam or hot water, liquid or condensate within the cured tire T should be discharged prior to reaching the opening condition illustrated in FIG. 7. Specific mechanisms for fluid control, supply or discharge have not been shown inasmuch as these may be of the general type as shown in a number of prior art patents to the inventor, including U.S. Pat. No. 2,846,722, to which reference is made for such details as are required to more fully understand the invention.

As numerically identified in FIGS. 1 and 8, the lower mold plate 24 located coaxially around the center mechanism 25 is securely mounted on a platen 49 carried on the base of the press and insulated as by a disk 50 of asbestos or equivalent material.

The upwardly facing molding surfaces of a plate 24 include a radially inner bead forming surface 51, a medial side wall folding ring 52 having substantially parallel side wall forming surfaces and a radially outer side wall and tread shoulder forming surface 53. Radially from the surface 53 the outer edge of the plate 24 is suitably shaped, as at 54, to provide a seat for the tread mold section 23.

The upper mold components

The upper mold plate 22 is carried by the platen 29. As numerically identified in FIG. 2, the downwardly facing molding surfaces of a plate 22 include a radially inner bead forming surface 55, a medial side wall forming ring 56 having substantially parallel side wall folding surfaces and a radially outer side wall and tread shoulder forming surface 57. Radially from the surface 57 the outer edge of the plate 22 is suitably shaped, as at 58, to provide a seat for the tread mold section 23.

The tread mold section 23 is carried beneath the upper mold plate 22 by elements of the velocity ratio linkage 60. The radially inward facing molding surface 59 forms the tread pattern of a tire T. The annular mold section 23 has upper and lower surfaces for mating with the surfaces 54 and 57 of the lower and upper mold plates 24 and 22.

The velocity ratio linkage

The velocity ratio linkage is indicated generally by the numeral 60. The linkage is actuated by movement of the top link 26 to control the movement of the tread mold section 23 so that during folding of the side wall portions of a carcass C by the folding rings 52 and 56, the tread mold section will be maintained at a predetermined position when in contact with the tread portion of a carcass C. In the embodiment described herein, the velocity of movement of the upper mold plate 24 is twice the velocity of the movement of the tread mold section 23, during the time period when the tread mold section 23 is constraining the tread portion of the carcass C.

Details of the velocity ratio linkage 60 are best shown in FIGS. 9 and 10. The linkage 60 includes a vertically positioned slide rod 61 terminating at the upper end in a swivel clevis 62 connected to the arcuately movable or free end of an actuator or lever arm 63 as by a pin 64. The rotatable or base end of the first lever arm 63 is mounted on a shaft 65 and attached thereto as by a key 66. The first shaft 65 extends through the top link 26 and is rotatably journaled in a mounting plate 67.

The slide rod 61 is carried by two guide bushings 68 mounted on a bracket 69 attached to the top link 26. When the top link 26 has been lowered a predetermined distance (FIG. 3 and thereafter), the lower end of the slide rod will engage an adjustable stop 70 mounted on the base of the press.

For connection of the first lever arm 63 to a second lever arm 76 the rotatable or base end of the lever arm 63 carries a first crank arm 71 rotatably attached to one end of an intermediate connector link 72 as by a pin 73. The other end of the connector link 72 is attached as by a pin 74 to a crank arm 75. The second crank arm 75 is carried on the rotatable or base end of the actuator or lever arm 76 mounted on a shaft 77 and attached thereto as by a key 78. The second shaft 77 also extends through the top link 26 being rotatably journaled in the mounting plate 67.

The arcuately movable or free end of the second lever arm 76 carries a swivel clevis 79 connected thereto as by a pin 80. The clevis 79 is attached to the upper end of a vertically positioned mold mounting rod 81 carried by a guide bushing 82 mounted on a bracket 83 attached to the top link 26. The mounting rod 81 extends downwardly through suitable holes in the mold support assembly and the lower end is detachably connected to a peripheral flange 84 encircling the upper edge of the tread mold section 23.

As shown (see also FIGS. 1 and 8) the velocity ratio linkage 60 has three rods for mounting the tread mold section 23. On the rear side of the top link 26 are two mold mounting rods, 85 and 86, having the same length as the rod 81 and being similarly mounted. As shown by the chain lines in FIG. 9, a rod 85 (or 86) has a swivel clevis 79 connected to the free end of a lever arm 76 as by a pin 80 and is carried by a guide bushing 82 mounted on a bracket 83. The lever arm 76 for the rod 85 is attached to the first shaft 65; the lever arm 76 for the rod 86 is attached to the second shaft 77.

The swivel clevises, 62 and 79, function as means to accommodate arcuate movement of the lever arms, 63 and 76, to linear movement of the rods 61, 81, 85 and 86. Stated another way, sliding movement of the rods is correlated with arcuate movement of the lever arms by clevis means.

Referring to FIG. 10, a swivel clevis 79 has two arms 86' connected at their upper ends to the lever arm 76 by the pin 80. Below the pin 80, the arms 86' are interconnected as by a spacer block 87. The lower ends of the arms 86' are interconnected by a socket block 88 housing a bushing 89 for movably enclosing a ball 90 mounted on the reduced diameter upper end of a shaft 81 (85, 86). The ball 90 is retained on the shaft by a collar 91 and pin 92. As shown, the swivel clevis 62 on the upper end of the slide rod 61 is similar to clevis 79, as just described, except that the clevis arms are twice the length of the arms 86'.

Referring to FIGS. 6 and 7, during opening movement of the top link 26 after curing the tire T, the action of the velocity ratio linkage 60 may be such that, first, the tread molding surface 59 of the mold section 23 is maintained in contact with the tread area of the tire T during stripping of the upper side wall areas from the molding surfaces 55, 56 and 57 of the mold section 22. Thereafter, the mold section 23 is preferably drawn up and closed with the surface 58 of the mold section 22 again in contact with the mold section 23.

The mold section 23 is drawn up and closed with the upper end mold plate 22 by power means such as fluid pressure operated cylinder 95. As best shown in FIG. 9, the cylinder 95 has a piston shaft 96 connected as by a pin 97 to the middle portion of the lever arm 63. The base of cylinder 96 is rotatably mounted as by pin 98 to a bracket 99 attached to the top link 26. When the piston shaft 96 is extended from the cylinder 95, the first lever arm 63 will be moved arcuately up and the mold section 23 will be raised to the condition of FIG. 7 through the linkage elements just described.

In summary as to the velocity ratio linkage 60, an expansible tire T is satisfactorily made as an item of high volume manufacture only when the motion of the middle or tread mold section 23 is a function of the press closing motion. When the velocity ratio linkage 60 is used according to the invention, linear movement of the slide rod 61, either by engagement with the stop 70 or by action of the cylinder 95, will be translated through the linkage elements, just described, to produce a linear movement of the mold mounting rods 81, 85 and 86. As shown, the "effective length" of the first lever arm 63 and clevis means 62 is twice the "effective length" of each of the second lever arms 76 and clevis means 79. Therefore, the vertical movement of the mold mounting rods 81, 85 and 86 will be one-half the vertical movement of the slide rod 61. If for any reason it would be desired to vary this velocity, of 2/1, this could be accomplished, for example, by replacement of the mounting plate 67 to provide different centers for the shafts 65 and 77 and substitution of different length lever arms 63 and 76, clevises 62 and 79, and a connecting link 72.

ALTERNATIVE EMBODIMENTS

As has been shown and described above, the press 20 is of the general type as shown in a number of prior patents to the inventor, including United States Pat. No. 2,808,618, to which reference is made for such details as are required to more fully understand the invention. These presses are constructed so that it is possible to obtain a maximum "tilt back" of the upper plate 22 and tread section 23 and clearance above the lower plate 24 without loss of valuable head room above the press. However, the concepts of the present invention could be used, for example, in presses where the mold components 22 and 23 are first moved directly away from and then laterally of the mold component 24. Presses of this type are illustrated by United States Pat. No. 3,097,394.

As has been shown and described above, the press center mechanism 25 has upper and lower bead ring plates, and operating components of the general type as shown in United States Pats. No. 2,812,544 and No. 2,812,545. Also as shown, manual loading of a green tire carcass and unloading of an expansible tire probably would be required. Therefore, in the event the concepts of the present invention were to be used in presses having thereon "automatic loaders" and/or "automatic unloaders," it might be desirable to use center mechanisms of the general type as shown in other prior art patents to the inventor, including United States Pat. No. 2,997,740.

Therefore, while a preferred embodiment of the invention has been shown and described, as required by the current Patent Office rules and procedures, it will be apparent that the invention is not to be limited thereto, and that changes and modifications may be made therein without departing from the spirit of the invention or from the scope of the appended claims.

I claim:
1. A vulcanizing press for the manufacture of a tire (T) having side wall portions in a three-part mold, said mold comprising end mold parts (22, 24) and a middle mold part (23), including means (60) controlling motion of said middle mold part 23 as a function of the press closing motion, said means 60 comprising a velocity ratio linkage carried on the top link (26) of said press and including a vertically positioned slide rod (61), a first lever arm (63) connected to a plurality of second lever arms (76), and a plurality of vertically positioned mold mounting rods (81, 85, 86), the slide rod 61 and first lever arm 63 and the mold mounting rods and second lever arms 76, each being individually connected by means (62 and 79) to accommodate arcuate movement of the lever arms to linear movement of the rods, said mounting rods being connected to said middle mold section 23.

2. A vulcanizing press according to claim 1 also including a center mechanism (25) having means to seat the bead portions of a green tire carcass (C) against said end mold parts 22, 24 prior to said closing of the side wall portions.

3. A vulcanizing press according to claim 1 wherein said center mechanism 25 has relatively movable bead ring plates (42, 44) to seat the bead portions of a carcass C against bead forming surfaces (51 and 55) of the end mold parts 22 and 24.

4. A vulcanizing press according to claim 1 wherein the slide rod 61 will engage an adjustable stop (70) mounted on the base of said press during the press closing motion.

5. A vulcanizing press according to claim 1 wherein the effective length of said first lever arm 63 and the rod connecting means 62 is twice the effective length of each of said second lever arms 76 and rod connecting means 79.

6. A vulcanizing press according to claim 1 wherein the base end of said first lever arm 63 is connected to the base end of one of said second lever arms 76 by a first crank arm (71) rotatably conected to a crank link (72) which is rotatably connected to a second crank arm (75).

7. A vulcanizing press according to claim 1 wherein said means (62 and 79) connecting said lever arms to said rods are swivel clevises, each said swivel clevis housing a bushing (89) for movably enclosing a ball (90) mounted on the uper end of a rod.

8. A vulcanizing press according to claim 1 wherein the middle mold part 23 is drawn up and closed with an upper end mold part (22) by a power means (95) connected to the first lever arm 63.

9. A control device for a vulcanizing press employing a three-part mold for receiving a tire carcass; said press having a movable top link, a base and means for introducing fluid media into the interior of a tire carcass within said mold; said mold including an upper mold plate carried by said top link, a lower mold plate carried on said press base, and a one-piece tread mold section being downwardly movable during press closing and carried by said upper mold plate; the movement of said tread mold section being controlled by a velocity ratio linkage means after the tire carcass is contacted by said upper mold plate and after introduction of fluid media interiorly of said carcass so that said tread mold section contacts and positions the tread portion of said carcass during closing of the mold parts for subsequent vulcanization to form a tire.

10. A control device according to claim 9 wherein said lower mold plate is stationary.

11. A control device according to claim 9 wherein said tire is of the folded sidewall type, said upper and lower mold plates each including a medial sidewall folding ring to effect the fold in the sidewall.

References Cited

UNITED STATES PATENTS

| 1,388,255 | 8/1921 | Hardeman | 18—17 |
| 2,812,545 | 11/1957 | Soderquist | 18—17 |
| 2,814,072 | 11/1957 | Soderquist | 18—17 |
| 3,184,794 | 5/1965 | Sherkin | 18—17 X |
| 3,276,930 | 10/1966 | Keefe. | |
| 3,347,964 | 10/1967 | Sidles | 18—17 X |
| 3,460,197 | 8/1969 | Cantarutte et al. | 18—17 X |
| 3,464,090 | 9/1969 | Cantarutte | 18—17 |

FOREIGN PATENTS

| 1,440,604 | 4/1966 | France. |

J. HOWARD FLINT, JR., Primary Examiner